United States Patent
Miki et al.

(10) Patent No.: US 9,217,983 B2
(45) Date of Patent: Dec. 22, 2015

(54) DRIVE TRANSMISSION DEVICE AND IMAGE FORMING APPARATUS INCLUDING THE SAME

(71) Applicant: KYOCERA Document Solutions Inc., Osaka (JP)

(72) Inventors: Masafumi Miki, Osaka (JP); Akihiro Yamaguchi, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/660,060

(22) Filed: Mar. 17, 2015

(65) Prior Publication Data

US 2015/0277336 A1 Oct. 1, 2015

(30) Foreign Application Priority Data

Mar. 28, 2014 (JP) .................. 2014-069068

(51) Int. Cl.
| | |
|---|---|
| G03G 15/00 | (2006.01) |
| F16D 41/20 | (2006.01) |
| F16D 47/04 | (2006.01) |
| F16D 27/118 | (2006.01) |
| F16D 13/08 | (2006.01) |

(52) U.S. Cl.
CPC ............. *G03G 15/757* (2013.01); *F16D 13/08* (2013.01); *F16D 27/118* (2013.01); *F16D 41/206* (2013.01); *F16D 47/04* (2013.01)

(58) Field of Classification Search
CPC ..... G03G 15/757; F16D 47/04; F16D 41/206; F16D 13/08; F16D 27/118
See application file for complete search history.

(56) References Cited

U.S. PATENT DOCUMENTS

| | | | | |
|---|---|---|---|---|
| 4,799,079 A | * | 1/1989 | Ujino | ............. G03G 15/23 271/3.03 |
| 5,495,327 A | * | 2/1996 | Inomata | ............. G03G 15/0896 399/228 |
| 7,306,216 B2 | * | 12/2007 | Lee | ............. B65H 3/08 271/10.01 |
| 7,536,129 B2 | * | 5/2009 | Lee | ............. B65H 3/08 347/10 |

FOREIGN PATENT DOCUMENTS

JP H11-282224 A 10/1999

* cited by examiner

*Primary Examiner* — Ryan Walsh
(74) *Attorney, Agent, or Firm* — Studebaker & Brackett PC

(57) ABSTRACT

A drive transmission device includes rotatable shafts, a first transmission mechanism that transmits first driving force, and a second transmission mechanism that transmits second driving force. The first driving force causes a specific rotatable shaft to rotate in a first rotation direction. The second driving force causes the specific rotatable shaft to rotate in a second rotation direction. The second transmission mechanism includes first and second gears, and a switching member that switches between coupling and decoupling of the first and second gears. While the first and second gears are coupled, the second driving force is transmitted to the specific rotatable shaft. The first transmission mechanism includes a cut-off member that cuts off transmission of the first driving force to the specific rotatable shaft upon the second driving force being transmitted to the specific rotatable shaft while the first driving force is being transmitted to the specific rotatable shaft.

7 Claims, 4 Drawing Sheets

DRIVE TRANSMISSION DEVICE AND IMAGE FORMING APPARATUS INCLUDING THE SAME

INCORPORATION BY REFERENCE

The present application claims priority under 35 U.S.C. §119 to Japanese Patent Application No. 2014-069068, filed Mar. 28, 2014. The contents of this application are incorporated herein by reference in their entirety.

BACKGROUND

The present disclosure relates to a drive transmission device and an image forming apparatus including the drive transmission device.

Image forming apparatuses such as printers and copiers typically include a plurality of rotatable members. For example, an electrophotographic image forming apparatus generally includes rotatable members such as a photosensitive drum, a development roller, and a plurality of conveyance rollers. An inkjet image forming apparatus also includes a plurality of conveyance rollers as rotatable members.

An image forming apparatus such as described above may include a drive transmission device that causes rotation of a specific group of rotatable members, among a plurality of rotatable members included in the image forming apparatus, in accordance with driving force from a single motor. In one example, an image forming apparatus includes a drive transmission device that transmits driving force from a single motor to a paper feed roller, a paper delivery roller, and a registration roller. The aforementioned drive transmission device can reverse the rotation direction of the paper delivery roller and the registration roller without reversing the rotation direction of the paper feed roller.

SUMMARY

A drive transmission device according to the present disclosure transmits driving force to a plurality of rotatable shafts. The drive transmission device includes the plurality of rotatable shafts, a drive source, a first transmission mechanism, and a second transmission mechanism. The drive source generates driving force. The first transmission mechanism transmits first driving force to a specific rotatable shaft among the plurality of rotatable shafts in accordance with driving force from the drive source. The first driving force causes the specific rotatable shaft to rotate in a first rotation direction. The second transmission mechanism transmits second driving force to the specific rotatable shaft in accordance with driving force from the drive source. The second driving force causes the specific rotatable shaft to rotate in a second rotation direction opposite to the first rotation direction. The first transmission mechanism includes a cut-off member. The cut-off member cuts off transmission of the first driving force to the specific rotatable shaft upon the second driving force being transmitted to the specific rotatable shaft from the second transmission mechanism while the first driving force is being transmitted to the specific rotatable shaft. The second transmission mechanism includes a first gear, a second gear, and a switching member. The first gear rotates in accordance with driving force from the drive source. The second gear is configured relative to the specific rotatable shaft such that driving force is transmitted therebetween. The switching member switches between enabling transmission of driving force from the first gear to the second gear and cutting off transmission of driving force from the first gear to the second gear. While transmission of driving force from the first gear to the second gear is enabled, the second driving force is transmitted from the second transmission mechanism to the specific rotatable shaft and the specific rotatable shaft rotates in the second rotation direction.

An image forming apparatus according to the present disclosure forms an image through development of an electrostatic latent image. The image forming apparatus includes a photosensitive drum, a development roller, and the drive transmission device described above. The electrostatic latent image is formed on the photosensitive drum. The development roller develops the electrostatic latent image by supplying toner to the photosensitive drum on which the electrostatic latent image is formed. The drive transmission device includes, as the plurality of rotatable shafts, a rotatable shaft that supports the photosensitive drum and a rotatable shaft that supports the development roller. The rotatable shaft that supports the development roller is the specific rotatable shaft.

Another image forming apparatus according to the present disclosure performs duplex image formation on a recording medium. The image forming apparatus includes a first conveyance roller, a second conveyance roller, and the drive transmission device described above. The first conveyance roller conveys a recording medium that is to be ejected. The second conveyance roller reverses a conveyance direction of a recording medium having an image on one side thereof that has been formed during duplex image formation. The drive transmission device includes, as the plurality of rotatable shafts, a rotatable shaft that supports the first conveyance roller and a rotatable shaft that supports the second conveyance roller. The rotatable shaft that supports the second conveyance roller is the specific rotatable shaft.

BRIEF DESCRIPTION OF THE DRAWINGS

FIG. 2B is a schematic illustration of operation of the drive transmission device according to the embodiment of the present disclosure while the switching member of the drive transmission device is switched on.

DETAILED DESCRIPTION

Figure 1:
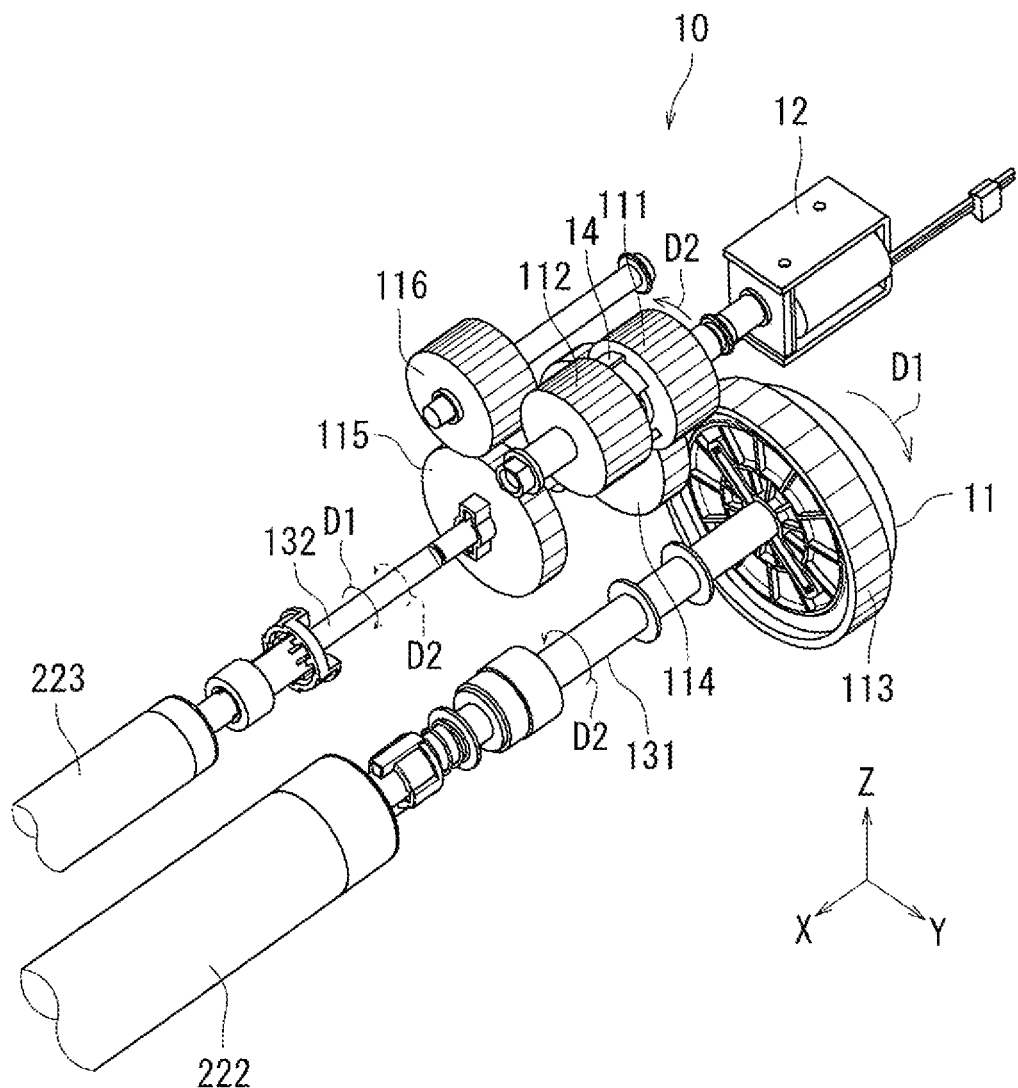
FIG. 1 is a perspective view of the main parts of a drive transmission device according to an embodiment of the present disclosure.

The following explains an embodiment of a drive transmission device and an image forming apparatus according to the present disclosure with reference to the drawings. Note that elements in the drawings that are the same or equivalent are labelled using the same reference signs and explanation thereof is not repeated. The drawings are schematic illustrations that emphasize elements of configuration in order to facilitate understanding thereof. Therefore, in order that elements of configuration can be easily illustrated, dimensions such as width and length of each of the elements in the drawings may differ from the actual dimensions thereof.

A drive transmission device 10 according to the embodiment of the present disclosure is first explained with reference to FIG. 1. FIG. 1 is a perspective view of the main parts of the drive transmission device 10.

As illustrated in FIG. 1, the drive transmission device 10 transmits driving force generated by a drive source 11 to a first rotatable shaft 131 and a second rotatable shaft 132, thereby causing the first rotatable shaft 131 and the second rotatable shaft 132 to each rotate. In the present embodiment, the first rotatable shaft 131 is a rotatable shaft of the photosensitive drum 222 and the second rotatable shaft 132 is a rotatable shaft of a development roller 223.

More specifically, the drive transmission device 10 causes the photosensitive drum 222 (rotatable member) and the development roller 223 (rotatable member) to rotate in opposite directions relative to each other during image formation. In the present embodiment, rotation of the drive source 11 in a first rotation direction D1 causes the photosensitive drum 222 to rotate in a second rotation direction D2 and causes the development roller 223 to rotate in the first rotation direction D1. In contrast to during image formation, during cleaning of the photosensitive drum 222 the drive transmission device 10 causes the photosensitive drum 222 to continue to rotate in the second rotation direction D2 and also causes the development roller 223 to rotate in the second rotation direction D2 in order to collect toner. The drive source 11 continues to rotate in same direction—the first rotation direction D1—during cleaning of the photosensitive drum 222. In other words, the drive transmission device 10 switches the rotation direction of the development roller 223 at a timing at which there is a switch between an image formation operation and a cleaning operation of the photosensitive drum 222, without switching the rotation direction of the drive source 11.

The drive transmission device 10 includes the drive source 11, a switching member 12, a coupling member 14, a plurality of gears, the first rotatable shaft 131, and the second rotatable shaft 132. In the present embodiment, the drive source 11 is a motor.

The plurality of gears are a first gear 111, a second gear 112, a third gear 113, a fourth gear 114, a fifth gear 115, and a sixth gear 116.

The first gear 111 meshes with the fourth gear 114. Driving force is transmitted to the fourth gear 114 from the drive source 11 via the third gear 113. As a consequence, the first gear 111 rotates in the second rotation direction D2 in accordance with driving force from the drive source 11. The first gear 111 couples with the second gear 112 via the coupling member 14 during cleaning of the photosensitive drum 222. The aforementioned coupling enables transmission of driving force from the first gear 111 to the second gear 112. In contrast to during cleaning, during image formation the first gear 111 is decoupled from the second gear 112. The aforementioned decoupling cuts off transmission of driving force from the first gear 111 to the second gear 112. More specifically, the switching member 12 switches between coupling and decoupling of the first gear 111 and the second gear 112. Therefore, the switching member 12 switches between enabling transmission of driving force from the first gear 111 to the second gear 112 and cutting off transmission of driving force from the first gear 111 to the second gear 112. The switching member 12 is a solenoid in the present embodiment. However, the switching member 12 may be any component that converts electrical energy to mechanical linear motion.

The second gear 112 couples with the first gear 111 during cleaning of the photosensitive drum 222. Through the aforementioned coupling, the second gear 112 rotates in the second rotation direction D2, thereby transmitting driving force to the second rotatable shaft 132. As a consequence, the second rotatable shaft 132 rotates in the second rotation direction D2. In the present embodiment, driving force is transmitted to the second rotatable shaft 132 from the second gear 112 via the sixth gear 116 and the fifth gear 115. The second gear 112 meshes with the sixth gear 116 and the sixth gear 116 meshes with the fifth gear 115. The fifth gear 115 is fixed to the second rotatable shaft 132.

Driving force is transmitted to the third gear 113 from an output shaft 141 (refer to FIGS. 2A and 2B) of the drive source 11. As a consequence, the third gear 113 rotates in the second rotation direction D2, thereby transmitting driving force to the first rotatable shaft 131. The aforementioned driving force causes the first rotatable shaft 131 to rotate in the second rotation direction D2.

The third gear 113 meshes with the fourth gear 114. The fourth gear 114 is driven by the third gear 113 such as to rotate in the first rotation direction D1. During image formation, the fourth gear 114 transmits driving force to the second rotatable shaft 132 via a square cross-section spring 13 (cut-off member). The aforementioned driving force causes the second rotatable shaft 132 to rotate in the first rotation direction D1 during image formation.

Note that during image formation, the first gear 111 is decoupled from the second gear 112. Therefore, the second rotatable shaft 132 rotates in the first rotation direction D1 as a result of driving force only being transmitted to the second rotatable shaft 132 from the fourth gear 114. Rotation of the second rotatable shaft 132 in the first rotation direction D1 causes the fifth gear 115 to rotate in the first rotation direction D1. The fifth gear 115 transmits driving force to the second gear 112 via the sixth gear 116. As a consequence, the second gear 112 rotates in the first rotation direction D1. Thus, driving force is transmitted from the second rotatable shaft 132 to the second gear 112, causing the second gear 112 to freely rotate. At the same time, the first gear 111 is driven by the fourth gear 114 such as to freely rotate in the second rotation direction D2.

Figure 2A:
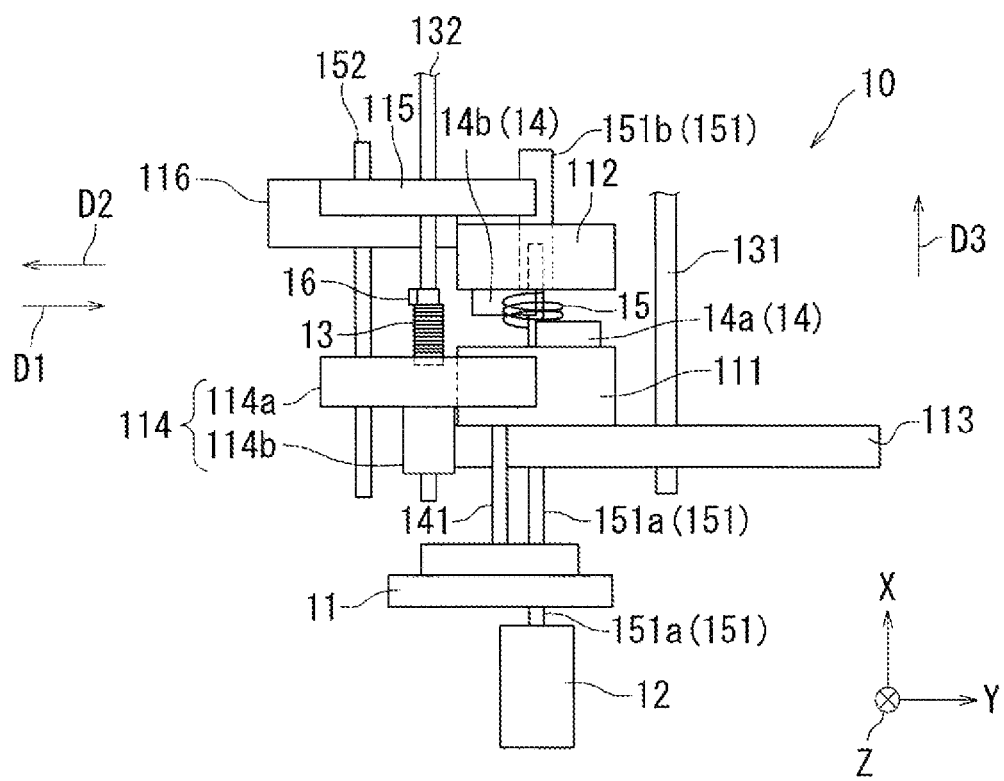
FIG. 2A is a schematic illustration of operation of the drive transmission device according to the embodiment of the present disclosure while a switching member of the drive transmission device is switched off.
Figure 2B:
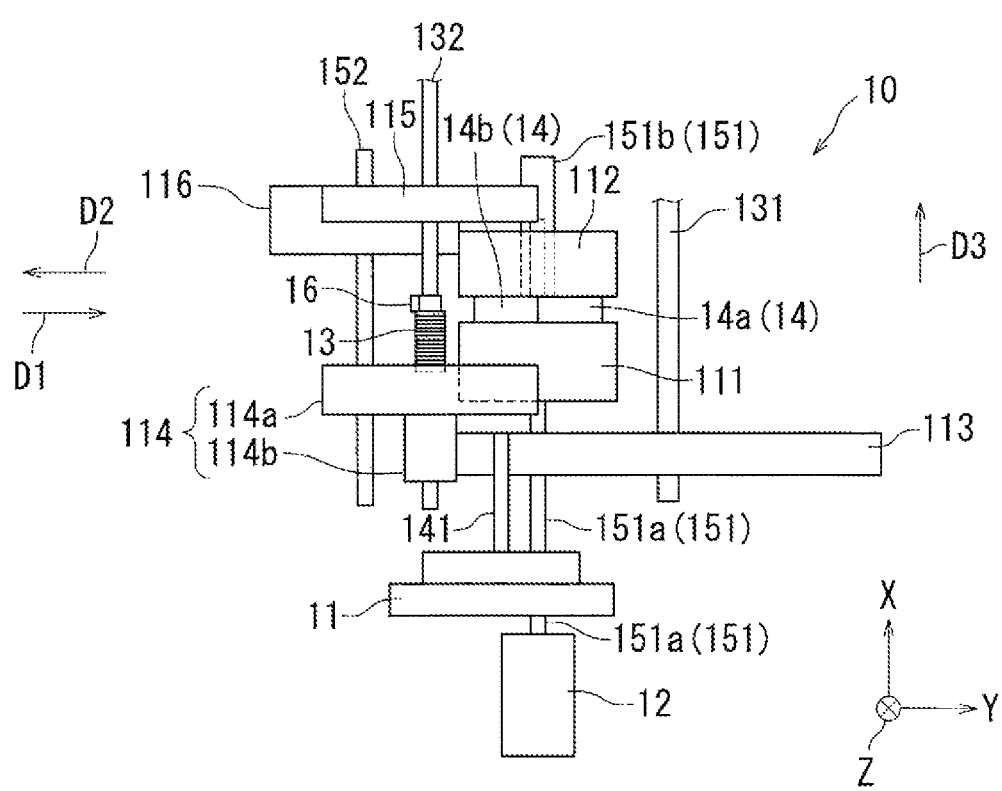
Figure 3:
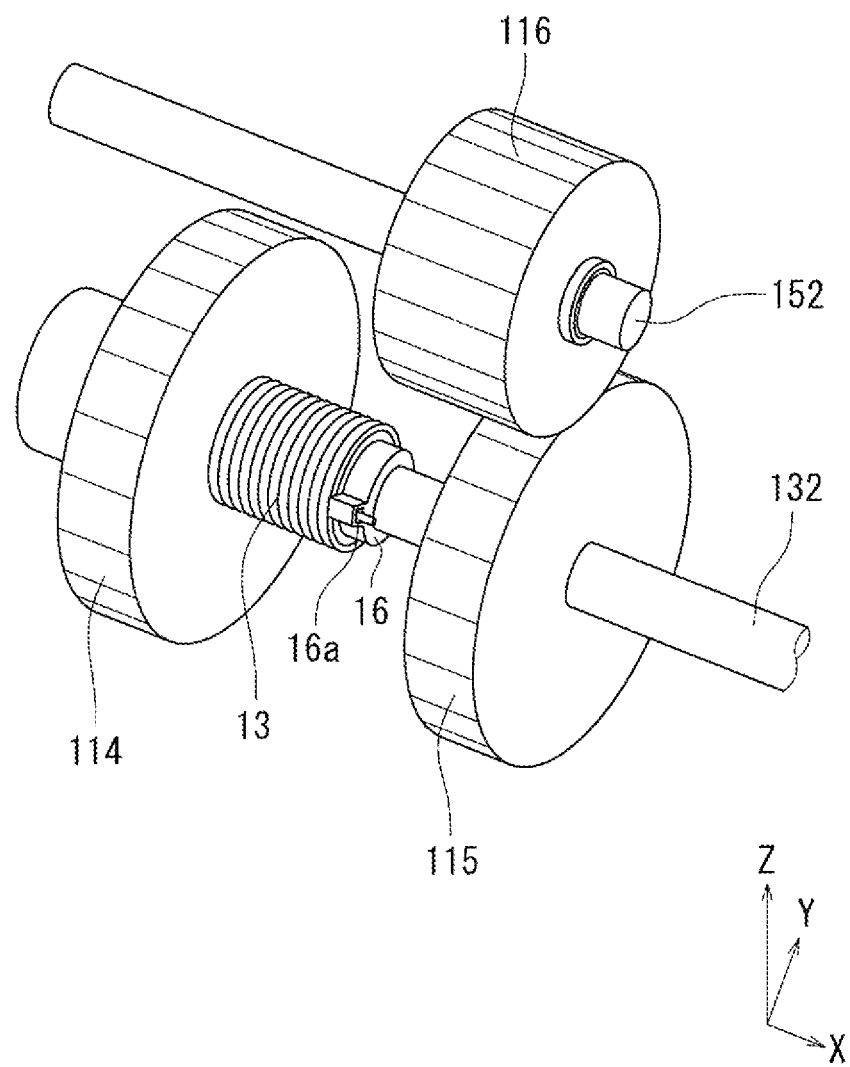
FIG. 3 is an enlarged perspective view of one section of the drive transmission device according to the embodiment of the present disclosure.

The following provides detailed explanation of operation of the drive transmission device 10 with reference to FIGS. 2A, 2B, and 3. FIG. 2A is a schematic illustration of operation of the drive transmission device 10 while the switching member 12 is switched off (non-driving time). FIG. 2B is a schematic illustration of operation of the drive transmission device 10 while the switching member 12 is switched on (driving time). In other words, FIG. 2A illustrates operation of the transmission device 10 during image formation and FIG. 2B illustrates operation of the drive transmission device 10 during cleaning of the photosensitive drum 222. FIG. 3 is an enlarged view of the square cross-section spring 13 and an attachment member 16.

As illustrated in FIG. 2A, the drive transmission device 10 further includes the square cross-section spring 13, the attachment member 16, a first central shaft 151 and a second central shaft 152.

The output shaft 141 transmits driving force from the drive source 11 to the third gear 113. The third gear 113 meshes with a small-diameter portion (gear) 114b of the fourth gear 114. A large-diameter portion (gear) 114a of the fourth gear 114 meshes with the first gear 111. Through the above configuration, driving force is transmitted from the drive source 11 to the first gear 111 via the third gear 113 and the fourth gear 114.

The first central shaft 151 is formed by a third central shaft 151a and a fourth central shaft 151b. The third central shaft 151a is an axial center of the first gear 111 and is fixed to the first gear 111. The fourth central shaft 151*b* is an axial center of the second gear 112 and is fixed to the second gear 112. The first gear 111 and the second gear 112 are located opposite to each another such that axial directions thereof match. A first end of the third central shaft 151*a* protrudes toward the second gear 112 from the first gear 111. The fourth central shaft 151*b* has a tubular shape such that the first end of the third central shaft 151*a* can be accommodated therein. A second end of the third central shaft 151*a* is connected to the switching member 12.

Driving of the switching member 12 causes the third central shaft 151*a* to move toward the fourth central shaft 151*b* in a direction D3. The aforementioned movement causes the first gear 111 to move toward the second gear 112. As a result, the first gear 111 couples with the second gear 112 via the coupling member 14 (refer to FIG. 2B).

The coupling member 14 is formed by a first coupling member 14*a* and a second coupling member 14*b*. The first coupling member 14*a* is fixed to a side of the first gear 111 that faces the second gear 112. The second coupling member 14*b* is fixed to a side of the second gear 112 that faces the first gear 111.

A spring 15 is located between the first gear 111 and the second gear 112. The spring 15 applies force on the first gear 111 in a direction away from the second gear 112 and applies force on the second gear 112 in a direction away from the first gear 111. Therefore, the force applied by the spring 15 causes the first gear 111 to separate from the second gear 112 while the switching member 12 is switched off. As a consequence, the first coupling member 14*a* and the second coupling member 14*b* are decoupled from each other.

On the other hand, driving of the switching member 12 causes the first gear 111 to move toward the second gear 112 against the force applied by the spring 15. As a consequence, the first coupling member 14*a* couples with the second coupling member 14*b*, and thus the first gear 111 couples with the second gear 112.

The first rotatable shaft 131 is fixed to the third gear 113. Driving force is transmitted to the third gear 113 from the output shaft 141 of the drive source 11, thereby causing the third gear 113 to rotate in the second rotation direction D2. Therefore, the first rotatable shaft 131 also rotates in the second rotation direction D2.

The fourth gear 114 is supported in a freely rotatable manner by the second rotatable shaft 132 and thus the second rotatable shaft 132 is a center of rotation of the fourth gear 114. The fourth gear 114 is driven by the third gear 113 such as to rotate in the first rotation direction D1. The square cross-section spring 13 is attached to the second rotatable shaft 132 by the attachment member 16.

More specifically, the second rotatable shaft 132 extends through a through hole in the attachment member 16 as illustrated in FIG. 3. Through the configuration described above, the attachment member 16 is supported in a manner such as to be non-rotatable relative to the second rotatable shaft 132. The square cross-section spring 13 is wound around the attachment member 16. Therefore, tightening force of the square cross-section spring 13 causes the square cross-section spring 13 to attach to the second rotatable shaft 132 via the attachment member 16. A first end of the square cross-section spring 13 extends through a through hole 16*a* in the attachment member 16. A second end of the square cross-section spring 13 is fitted into a recess in the fourth gear 114 as illustrated in FIG. 2A. Through the configuration described above, driving force is transmitted from the fourth gear 114 to the second rotatable shaft 132 via the square cross-section spring 13. Therefore, the second rotatable shaft 132 rotates in the first rotation direction D1 while the switching member 12 is switched off.

The fifth gear 115 faces the fourth gear 114. The fifth gear 115 is fixed to the second rotatable shaft 132. While the switching member 12 is switched off, the fifth gear 115 rotates in the same direction as the second rotatable shaft 132 (i.e., the first rotation direction D0 with the second rotatable shaft 132 as a center of rotation.

The fifth gear 115 meshes with the sixth gear 116. The sixth gear 116 rotates with the second central shaft 152 as a center of rotation. The second central shaft 152 is fixed to the sixth gear 116. As a result of the configuration described above, the sixth gear 116 rotates in the second rotation direction D2 while the switching member 12 is switched off. The sixth gear 116 also meshes with the second gear 112. Therefore, the second gear 112 is driven by the sixth gear 116 such as to rotate in the first rotation direction D1, with the fourth central shaft 151*b* as a center of rotation, while the switching member 12 is switched off.

The following explains operation of the transmission device 10 while the switching member 12 is switched on with reference to FIG. 2B. As illustrated in FIG. 2B, upon the switching member 12 being switched on, the first gear 111 moves toward the second gear 112 and couples with the second gear 112 via the coupling member 14. The aforementioned coupling enables driving force to be transmitted from the first gear 111 to the second gear 112. Upon driving force being transmitted to the second gear 112 from the first gear 111, the rotation direction of the second gear 112 is reversed from the first rotation direction D1 to the second rotation direction D2.

The second gear 112 forms a gear train with the fifth gear 115 and the sixth gear 116. Upon the rotation direction of the second gear 112 being reversed, the rotation directions of the other gears in the gear train (i.e., the fifth gear 115 and the sixth gear 116) are also reversed.

Once the rotation direction of the fifth gear 115 is reversed, the fourth gear 114 and the fifth gear 115 rotate in opposite directions. Through the configuration described above, force acts on the square cross-section spring 13 in a direction of loosening the square cross-section spring 13. As a consequence, the second end of the square cross-section spring 13 slides within the recess of the fourth gear 114 and thus transmission of driving force (first driving force) from the fourth gear 114 to the second rotatable shaft 132 is cut-off. Thus, the second rotatable shaft 132 rotates in the second rotation direction D2 as a result of driving force (second driving force) transmitted from the fifth gear 115. The fourth gear 114 rotates freely during the above.

As explained above, a first transmission mechanism is implemented in the present embodiment by the third gear 113, the fourth gear 114, the attachment member 16, and the square cross-section spring 13. The first transmission mechanism transmits first driving force to the second rotatable shaft 132 in accordance with driving force from the drive source 11. The first driving force causes the second rotatable shaft 132 to rotate in the first rotation direction D1. Also, a second transmission mechanism is implemented in the present embodiment by the third gear 113, the fourth gear 114, the first gear 111, the second gear 112, the spring 15, the coupling member 14, the fifth gear 115, the sixth gear 116, and the switching member 12. The second transmission mechanism transmits second driving force to the second rotatable shaft 132 in accordance with driving force from the drive source 11. The second driving force causes the second rotatable shaft 132 to rotate in the second rotation direction D2 opposite to the first rotation direction D1. In other words, the present embodiment enables reversing of the rotation direction of the second rotatable shaft 132, which is one of a plurality of rotatable shafts 131 and 132 to which driving force is transmitted from a single drive source 11, without switching the rotation direction of the drive source 11.

Preferably tightening torque Ns of the square cross-section spring 13 satisfies Equation 1 shown below.

$$Ns > Nr + Ng \qquad (1)$$

In Equation 1, Nr represents rotational torque of the second rotatable shaft 132. Also, Ng represents the sum of rotational torque of all of the gears (i.e., the first to sixth gears 111-116). The tightening torque Ns of the square cross-section spring 13 satisfying Equation 1 ensures that the square cross-section spring 13 is securely fixed to the second rotatable shaft 132 via the attachment member 16.

Figure 4:
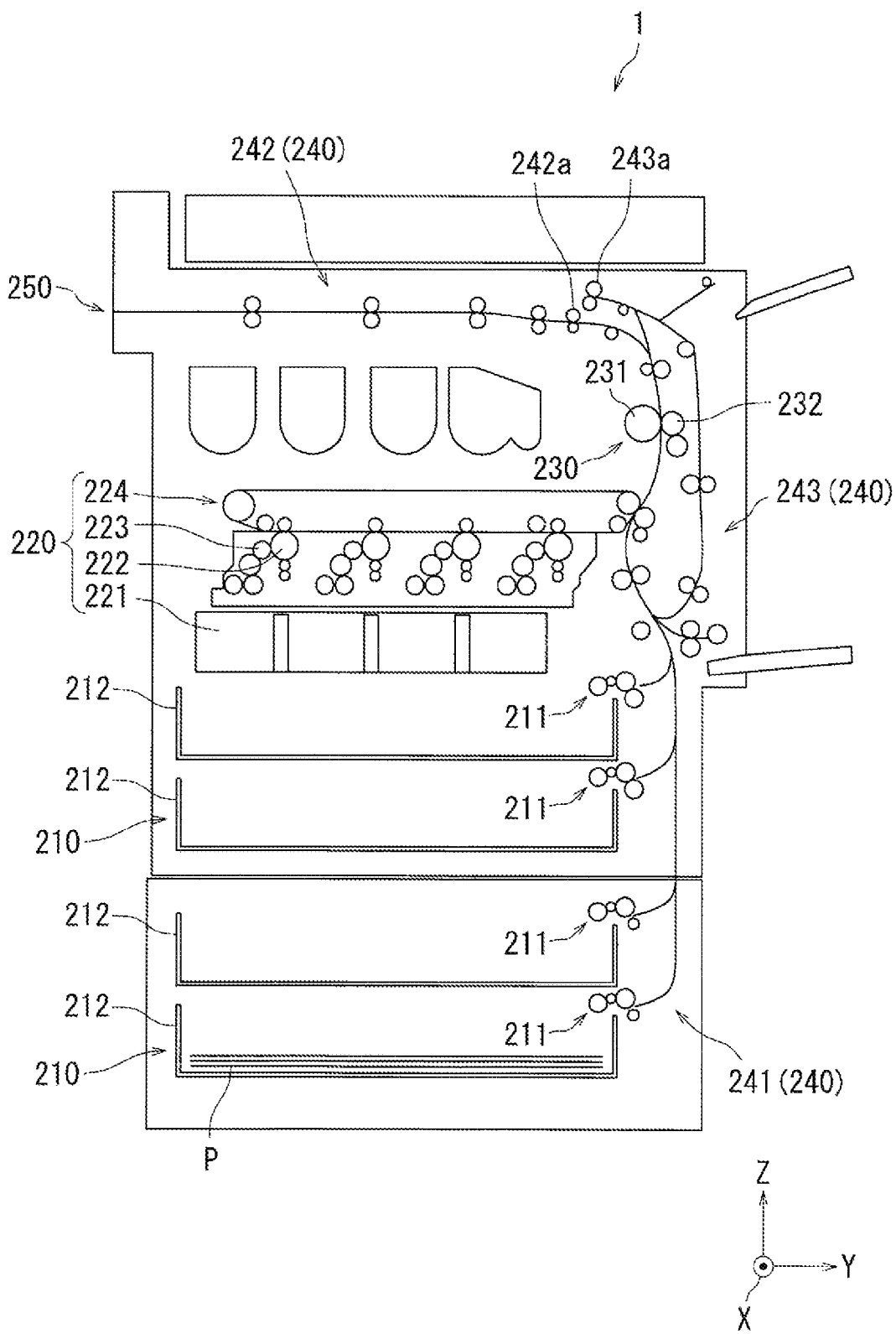
FIG. 4 is a schematic illustration of an image forming apparatus according to the embodiment of the present disclosure.

The following explains an image forming apparatus 1 according to the embodiment of the present disclosure with reference to FIG. 4. Although not illustrated in FIG. 4, the image forming apparatus 1 includes the drive transmission device 10 explained with reference to FIGS. 1-3. The image forming apparatus 1 can be a copier, a printer, a facsimile machine, or a multifunction peripheral that implements functions of the aforementioned machines.

The image forming apparatus 1 includes a paper feed section 210, an imaging section 220, a fusing device 230, a paper conveyance section 240, and a paper ejecting section 250.

The paper feed section 210 stores a plurality of sheets of paper P and feeds the sheets P to the paper conveyance section 240. The paper feed section 210 includes a plurality of groups of paper feed rollers 211 and a plurality of paper feed cassettes 212. Each of the groups of paper feed rollers 211 is located in a position corresponding to a corresponding one of the paper feed cassettes 212. The group of paper feed rollers 211 picks up sheets P stored in the corresponding paper feed cassette 212 one at a time and supplies each of the sheets P to the paper conveyance section 240.

The imaging section 220 forms a toner image on the sheet P. The imaging section 220 includes a light-exposure device 221, a plurality of photosensitive drums 222, a plurality of development rollers 223, and a transfer device 224. Each of the plurality of development rollers 223 is located in a position corresponding to a corresponding one of the photosensitive drums 222.

A drive transmission device 10 is provided for each pairing of one of the photosensitive drums 222 with a corresponding one of the development rollers 223. Through such a configuration, driving force is transmitted from each of the drive transmission devices 10 to the corresponding photosensitive drum 222 and the corresponding development roller 223. Note that alternatively driving force may be transmitted from a single drive transmission device 10 to a plurality of photosensitive drums 222 and a plurality of development rollers 223 corresponding to the photosensitive drums 222.

The light-exposure device 221 irradiates each of the photosensitive drums 222 with laser light based on image data, thereby forming an electrostatic latent image on the photosensitive drum 222. Each of the photosensitive drums 222 functions as a bearer of an electrostatic latent image and a toner image. Each of the development rollers 223 develops an electrostatic latent image into a toner image by supplying toner to the corresponding photosensitive drum 222. Through the above, a toner image is formed on each of the photosensitive drums 222. The transfer device 224 transfers the toner images onto the sheet P from the photosensitive drums 222 such that the toner images are superposed on one another. As explained with reference to FIG. 1, in the present embodiment each of the photosensitive drums 222 is supported by a first rotatable shaft 131 and each of the development rollers 223 is supported by a second rotatable shaft 132.

The fusing device 230 applies heat and pressure to the sheet P through a fusing member 231 and a pressing member 232, thereby fusing the unfused toner image that has been formed by the imaging section 220 to the sheet P.

The paper conveyance section 240 conveys the sheet P to the paper ejecting section 250 via the imaging section 220 and the fusing device 230. The paper ejecting section 250 ejects the sheet P externally from the image forming apparatus 1. The paper conveyance section 240 includes a first paper conveyance section 241, a second paper conveyance section 242, and a third paper conveyance section 243.

The first paper conveyance section 241 conveys a sheet P that is fed from the paper feed section 210, thereby conveying the sheet P to the fusing device 230 via the imaging section 220. The second paper conveyance section 242 conveys a sheet P that is conveyed from the fusing device 230, thereby conveying the sheet P to the third paper conveyance section 243 or the paper ejecting section 250. The second paper conveyance section 242 includes a first pair of conveyance rollers 242a. The third paper conveyance section 243 is used when images are to be formed on both sides of the sheet P. In other words, the third paper conveyance section 243 conveys, to the first paper conveyance section 241, a sheet P having a toner image on one side thereof that has been fused by the fusing device 230. The third paper conveyance section 243 includes a second pair of conveyance rollers 243a.

The first pair of conveyance rollers 242a conveys the sheet P toward the paper ejecting section 250. The second pair of conveyance rollers 243a reverses the conveyance direction of the sheet P once the sheet P is sandwiched therebetween and conveys the sheet P toward the first paper conveyance section 241.

The above describes an embodiment of the present disclosure with reference to the drawings (FIGS. 1-4). However, the present disclosure is of course not limited to the embodiment described above and may be implemented in various different forms so long as such implementations do not deviate from the intended scope of the present disclosure.

For example, although the coupling member 14 is included in the present embodiment, alternatively the first gear 111 and the second gear 112 may have shapes that enable fitting together thereof. Also, an elastic member other than the square cross-section spring 13 may be used as the cut-off member.

Although driving force is transmitted from the first gear 111 to the second gear 112 in the present embodiment through coupling of the first gear 111 with the second gear 112 via the coupling member 14, the mechanism by which driving force is transmitted from the first gear 111 to the second gear 112 is not limited to the mechanism in the present embodiment. For example, the mechanism by which driving force is transmitted from the first gear 111 to the second gear 112 may include a gear.

Also, although the square cross-section spring 13 is used as the cut-off member in the present embodiment, the cut-off member is not limited to being the square cross-section spring 13. The cut-off member may be a component having a mechanism that only transmits driving force in one direction and hence does not transmit driving force in the opposite direction. For example, the cut-off member can be a one-way clutch.

The present embodiment is explained for a configuration in which the first rotatable shaft 131 supports the photosensitive drum 222 and the second rotatable shaft 132 supports the development roller 223, but the transmission device 10 can also be used to rotate components other than the photosensitive drum 222 and the development roller 223. For example, the drive transmission device 10 may be used to rotate the first pair of conveyance rollers 242a (rotatable member) and the second pair of conveyance rollers 243a (rotatable member). In such a configuration, the first rotatable shaft 131 supports one roller of the first pair of conveyance rollers 242a and the second rotatable shaft 132 supports one roller of the second pair of conveyance rollers 243a.

Furthermore, the present embodiment is explained for a configuration in which the drive transmission device 10 transmits driving force to two rotatable members, but in another example of configuration the drive transmission device 10 may transmit driving force to three or more rotatable members.

Although six gears are used in the present embodiment, the number of gears is not limited to six.

The present embodiment is explained for a configuration in which the third central shaft 151a and the fourth central shaft 151b are coupled to form the first central shaft 151, but in another example of configuration the third central shaft 151a and the fourth central shaft 151b may be permanently separated from one another.

Although the present embodiment is explained for a situation in which the recording medium is a sheet of paper P, alternatively a different type of recording medium may be used (for example, a resin sheet or cloth).

The present embodiment is explained for an example in which the present disclosure is applied to an electrophotographic image forming apparatus, but the present disclosure can, for example, also be applied to an inkjet image forming apparatus.

In addition to the alternative examples explained above, various modifications can be made to the embodiment so long as such modifications do not deviate from the intended scope of the present disclosure.

What is claimed is:

1. A drive transmission device for transmitting driving force to a plurality of rotatable shafts, comprising:
    the plurality of rotatable shafts;
    a drive source that generates driving force;
    a first transmission mechanism that transmits first driving force to a specific rotatable shaft among the plurality of rotatable shafts in accordance with driving force from the drive source, the first driving force causing the specific rotatable shaft to rotate in a first rotation direction; and
    a second transmission mechanism that transmits second driving force to the specific rotatable shaft in accordance with driving force from the drive source, the second driving force causing the specific rotatable shaft to rotate in a second rotation direction opposite to the first rotation direction, wherein
    the first transmission mechanism includes a cut-off member that cuts off transmission of the first driving force to the specific rotatable shaft upon the second driving force being transmitted to the specific rotatable shaft from the second transmission mechanism while the first driving force is being transmitted to the specific rotatable shaft,
    the second transmission mechanism includes
        a first gear that rotates in accordance with driving force from the drive source,
        a second gear configured relative to the specific rotatable shaft such that driving force is transmitted therebetween, and
        a switching member that switches between enabling transmission of driving force from the first gear to the second gear and cutting off transmission of driving force from the first gear to the second gear, and
    while transmission of driving force from the first gear to the second gear is enabled, the second driving force is transmitted from the second transmission mechanism to the specific rotatable shaft and the specific rotatable shaft rotates in the second direction.

2. The drive transmission device according to claim 1, wherein
    the switching member is a solenoid.

3. The drive transmission device according to claim 1, wherein
    the cut-off member is an elastic member.

4. The drive transmission device according to claim 3, wherein
    the cut-off member is a square cross-section spring.

5. The drive transmission device according to claim 1, wherein
    the cut-off member is a one-way clutch.

6. An image forming apparatus for forming an image through development of an electrostatic latent image, comprising:
    a photosensitive drum on which the electrostatic latent image is formed;
    a development roller that develops the electrostatic latent image by supplying toner to the photosensitive drum on which the electrostatic latent image is formed; and
    the drive transmission device according to claim 1, wherein
    the drive transmission device includes, as the plurality of rotatable shafts, a rotatable shaft that supports the photosensitive drum and a rotatable shaft that supports the development roller, and
    the rotatable shaft that supports the development roller is the specific rotatable shaft.

7. An image forming apparatus for performing duplex image formation on a recording medium, comprising:
    a first conveyance roller that conveys a recording medium that is to be ejected;
    a second conveyance roller that reverses a conveyance direction of a recording medium having an image on one side thereof that has been formed during duplex image formation; and
    the drive transmission device according to claim 1, wherein
    the transmission device includes, as the plurality of rotatable shafts, a rotatable shaft that supports the first conveyance roller and a rotatable shaft that supports the second conveyance roller, and
    the rotatable shaft that supports the second conveyance roller is the specific rotatable shaft.

* * * * *